(12) United States Patent
Gadari et al.

(10) Patent No.: US 10,578,304 B2
(45) Date of Patent: Mar. 3, 2020

(54) APPARATUS AND METHOD FOR PROGRESSIVE REDUCTION OF FLUE GAS

(71) Applicant: INDIAN OIL CORPORATION LIMITED, Mumbai (IN)

(72) Inventors: Saidulu Gadari, Faridabad (IN); Manoj Kumar Yadav, Faridabad (IN); Shoeb Hussain Khan, Faridabad (IN); Satheesh Vetterkunnel Kumaran, Faridabad (IN); Debasis Bhattacharyya, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 43 days.

(21) Appl. No.: 15/921,629

(22) Filed: Mar. 14, 2018

(65) Prior Publication Data
US 2019/0011126 A1    Jan. 10, 2019

(30) Foreign Application Priority Data

Jul. 7, 2017   (IN) .............................. 201721024070

(51) Int. Cl.
*F15D 1/02* (2006.01)
*F23J 13/00* (2006.01)
*B01J 4/00* (2006.01)

(52) U.S. Cl.
CPC ............... *F23J 13/00* (2013.01); *B01J 4/001* (2013.01); *F15D 1/025* (2013.01); *F23J 2213/202* (2013.01); *F23J 2900/13001* (2013.01)

(58) Field of Classification Search
CPC ................... F23J 13/00; F23J 2213/202; F23J 2900/13001; F15D 1/025; B01J 4/001
See application file for complete search history.

(56) References Cited

U.S. PATENT DOCUMENTS

2013/0152525 A1* 6/2013 Brandner ............... B01D 45/16
55/447

* cited by examiner

*Primary Examiner* — Randy Boyer
*Assistant Examiner* — Juan C Valencia
(74) *Attorney, Agent, or Firm* — Maschoff Brennan (57) ABSTRACT

An apparatus and a method for achieving progressive reduction of flue gas is disclosed. Accordingly, an aspect of the present invention is to provide an apparatus comprising of an orifice chamber having an inlet pipe for receiving the flue gas, a flow region defined downstream of an exit of the inlet pipe and having at least a first section and a second section, and an outlet pipe to disperse a pressure reduced flue gas. The first section defined downstream of the inlet pipe has a flow developer means and at least one auxiliary orifice plate. The second section defined downstream of the first section has a plurality of orifice plates spaced apart along a flow length of the second section.

10 Claims, 8 Drawing Sheets

APPARATUS AND METHOD FOR PROGRESSIVE REDUCTION OF FLUE GAS

FIELD OF THE INVENTION

The present invention is related to an improved assembly of orifice chamber for progressive and gradual reduction of pressure of flue gas from the regenerator of a catalytic cracking unit.

BACKGROUND OF THE INVENTION

In circulating fluidized bed catalytic cracking units, spent catalyst is reactivated in regenerator by burning the coke deposited using air as the oxidant. The flue gas generated during the regeneration step is released to the atmosphere after reducing the pressure and recovering the heat. The regenerator is typically operated at a pressure range of 1.5 to 3 $kg/cm^2$ (g) and in the temperature range of 650 to 750° C. The regenerator pressure is controlled by a double disc slide valve (DDSV). Typically, an orifice chamber is provided at the downstream of DDSV for progressively & gradually reducing the pressure of flue gas. Each orifice chamber is equipped with one or more orifice plates, and typically it has a minimum of two and a maximum of seven orifice plates in order to progressively take small pressure drops across the orifice plates instead of single step pressure reduction. DDSV opening varies as directly proportional to the square of the velocity of flue gas. The typical orifice velocities across the DDSV and orifice chamber are maintained about 250 m/s and 150 m/s respectively. Theoretically, it is possible to operate DDSV and orifice chamber at much higher velocities but with increased noise and erosion of orifices.

A gap of 60 cm between successive orifice plates is maintained for periodic inspection and maintenance in orifice chamber. Further, orifice chamber is equipped with multiple man-ways or manholes for access to each orifice plates for inspection and repair or replacement. In such locations, 100 to 120 cm gap is provided between successive orifice plates. The diameter of the orifice chamber ranges typically from 75 to 350 cm and the ratio between diameters of orifice chamber to the diameter of inlet flue gas line is typically 5 to 10. Due to the difference in diameter, a sudden flow expansion takes place at the entrance of the orifice chamber. The flue gas leaving the flue gas line forms a jet in the initial portion of orifice chamber and subsequently disperses across the orifice chamber and a fully-developed flow region is achieved. Due to this, the first orifice plate is provided much below the exit of the flue gas pipe, typically 250 to 350 cm to ensure that the flue gas flow is fully developed before it passes through the orifices of the plate.

During the revamp of the unit, the pressure of reactor and regenerator goes up by 1 to 2 kg/cm2 due to higher feed input and higher air rate. In such cases, 1 or 2 additional orifice plates are to be installed to reduce the pressure of the flue gas. The flowing medium is typically flue gas from a catalytic cracking unit going to the stack outlet of a refinery. The flue gas is a result of the combustion process in a regenerator of a catalytic cracking unit.

Figure 1:
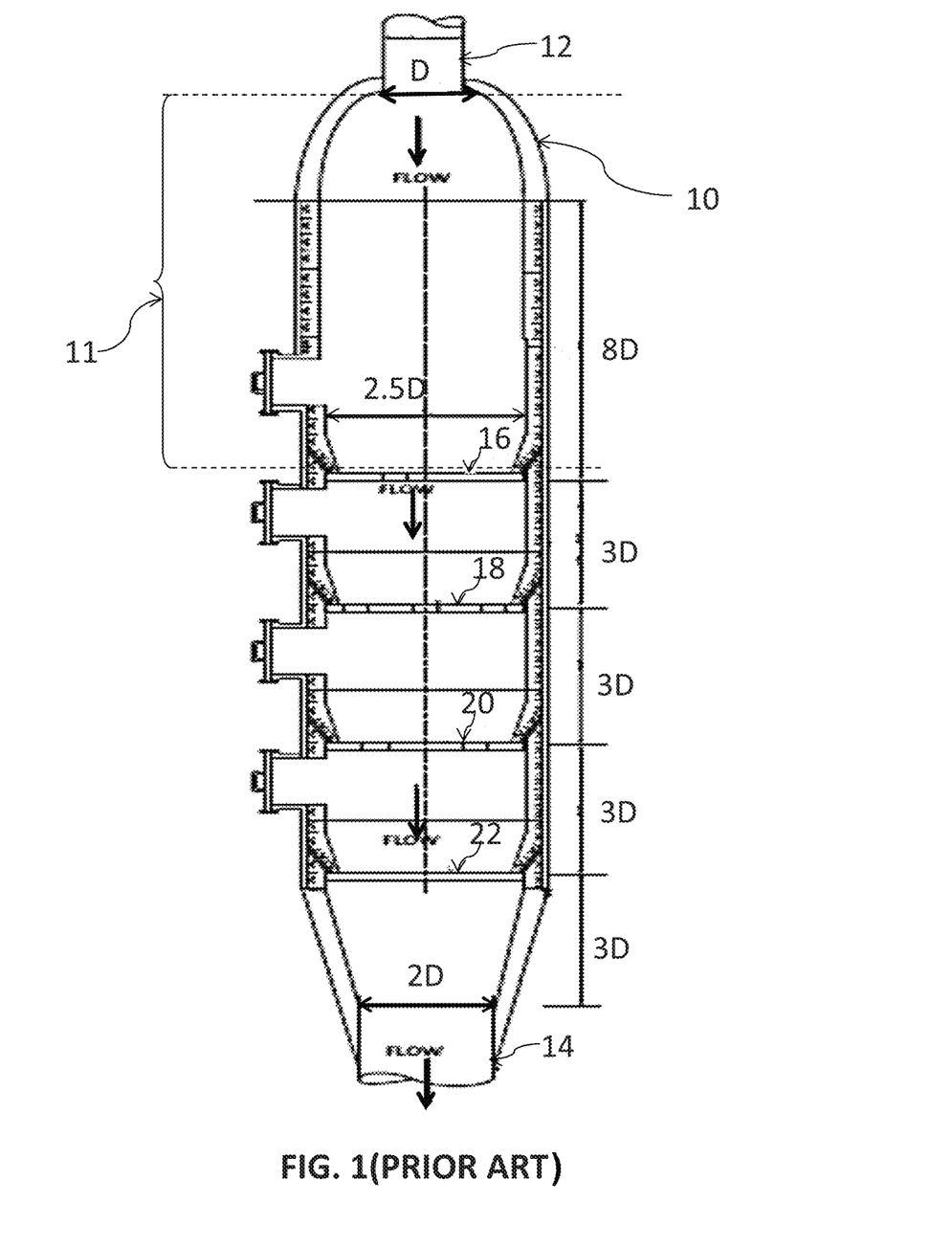
FIG. 1 illustrates a prior art assembly of orifice chamber for reducing the pressure of flue gas.

FIG. 1 illustrates a longitudinal view of a section of a prior art assembly of orifice chamber 10 conventionally in-use which requires a flow length approximately 10 times the diameter 'D' of an inlet flue gas line 12 for achieving a fully developed flow in the initial portion 11 of the orifice chamber defined in a region prior to the location of the first orifice plate 16. The diameter of the inlet flue gas line 12 is represented as 'D' in FIG. 1. Further, the prior art of FIG. 1 illustrates a first orifice plate 16, and additional orifice plates, 18, 20 and 22 is located within the orifice chamber 10. The location of the first orifice plate 16 from the exit of the inlet pipe 12 may be approximated as 10D, where 10D defines a length of the fully developed flow in the initial portion 11.

Accommodating the additional orifice plates in existing orifice chamber is difficult as space between the orifice plates is limited for inspection & maintenance. Installing auxiliary orifice chamber with 1 or more orifice plates requires a separate permanent civil structure, which demands more no of shutdown days. If additional grids are not installed, the load in terms of pressure drop increase on DDSV, which causes erosion on DDSV discs.

It would be highly desirable to provide an improvement in the present assemblies of such orifice chambers which would enable to accommodate additional orifice plates without scarifying the clearance gap between the orifice plates.

SUMMARY OF THE INVENTION

The present invention as embodied and broadly described herein discloses an apparatus and a method for reducing pressure of flue gas. An orifice chamber employed in the present invention is able to accommodate additional orifice plates to achieve higher pressure drop during revamp applications. Thus, the requirement of additional orifice chamber to achieve the same pressure drop is eliminated. Accordingly, an aspect of the present invention is to provide an apparatus comprising of an orifice chamber having an inlet pipe for receiving the flue gas, a flow region defined downstream of an exit of the inlet pipe and having at least a first section and a second section, and an outlet pipe to disperse a pressure reduced flue gas. The first section defined downstream of the inlet pipe has a flow developer means and at least one auxiliary orifice plate. The second section defined downstream of the first section has a plurality of orifice plates spaced apart along a flow length of the second section.

In one aspect of the present invention, the flow developer means includes a plurality of circumferentially oriented vanes directed radially outwards towards walls of the orifice chamber.

In another aspect of the present invention, the flow developer means includes a constricted section downstream of the exit of the inlet pipe, wherein the constricted section is tapered longitudinally and having a closed distal end, the constricted section defining a plurality of exits on a tapered surface of the constricted section In one embodiment, the apparatus as provided in the present invention is a part of a fluid catalytic cracking (FCC) unit wherein the flue gas is generated during a combustion process in a spent catalyst regenerator of the FCC unit.

Another aspect of the present invention is to provide a method of reducing pressure of a flue gas. The method may comprise of providing an apparatus for reducing pressure of the flue gas, the apparatus comprising of an orifice chamber having an inlet pipe for receiving the flue gas, a flow region defined downstream of an exit of the inlet pipe and having a first section and a second section, and an outlet pipe to disperse a pressure reduced flue gas. The first section defined downstream of the inlet pipe has a flow developer means and at least one auxiliary orifice plate. The second section defined downstream of the first section has a plurality of orifice plates spaced apart along a flow length of the second section. The method may further comprise of introducing the flue gas into the inlet pipe of the orifice chamber, achieving progressive reduction of pressure of the flue gas between successive orifice plates including the at least one auxiliary orifice plate of the first section and the plurality of orifice plates of the second section, and dispersing the pressure reduced flue gas through the outlet pipe.

The flow developer means as provided by the present invention achieves a fully developed flow of flue gas in short distance and accordingly, more orifice plates can be accommodated in the orifice chamber, i.e., at least one additional auxiliary office plate in the first chamber. Additionally, the flow developer means introduces an array of the inlet for the flue gas into the orifice chamber to achieve additional pressure drop required during revamp applications and it generates cushion in the space required for installing additional orifice plates, i.e., the auxiliary orifice plates, in the orifice chamber to achieve more pressure drop.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" are defined as meaning "no embodiment, or one embodiment, or more than one embodiment, or all embodiments."

The terminology and structure employed herein is for describing, teaching and illuminating some embodiments and their specific features and elements and does not limit, restrict or reduce the scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility, and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

In accordance with an embodiment of the present invention, an apparatus for reducing the pressure of flue gas is disclosed. The apparatus comprises of an orifice chamber having an inlet pipe for receiving the flue gas and an outlet pipe to disperse a pressure reduced flue gas. In accordance with one embodiment, the apparatus as disclosed may form part of a fluid catalytic cracking (FCC) unit wherein the flue gas is generated during a combustion process in a spent catalyst regenerator of the FCC unit. The inlet pipe may be connected to a flow valve (not shown) for controlling the regenerator pressure of the FCC unit wherein the orifice chamber is located downstream of the flow valve. Further, the outlet pipe may be connected to a stack flow of a refinery (not shown) as known in the art.

The inlet pipe of the orifice chamber may have a diameter D whereas the outlet pipe may have a diameter twice that of the inlet pipe, i.e. 2D. Further, the orifice chamber may have a flow length L up to first section which may be 10 times the diameter D of the inlet pipe. By way of an example, the orifice chambers in FCC unit accordance with an embodiment includes a plurality of orifice plates, for e.g., the orifice plates (16, 18, 20, and 22) shown in FIG. 1 (prior art) to reduce the pressure of the flue gas in the downstream of the orifice chamber. The plurality of orifice plates may include a minimum of two and a maximum of seven orifice plates in order to take progressively small and gradual pressure drops across each orifice plate in lieu of one large pressure drop to reduce wear on each orifice plate and reduce the overall noise caused by the gas flow. Further, the orifice plates may be fabricated with or without nozzles.

In a further example, the flue gas velocity in the inlet pipe can be as high as 45 m/s and after introducing into the orifice chamber, it may come down to as low as 10 m/s. For uniform flow expansion, a first orifice plate (for e.g., the orifice plate 16) amongst the plurality of the orifice plates may be provided at a location situated at a length of about 8 to 10 times the diameter D of the inlet pipe. Further, the overall height of the orifice chamber may be approximately 20 times the diameter D of the inlet pipe for achieving a fully developed uniform flow inside the orifice chamber. For illustrative purposes, the dimension of the inlet pipe, the portion of the orifice chamber downstream of the inlet pipe, and the outlet pipe are marked in FIG. 1 (prior art).

A flow region corresponding to the flue gas flowing within the orifice chamber may be defined downstream of the exit of the inlet pipe within the orifice chamber. In accordance with an embodiment of the present invention, the flow region may have at least a first section and a second section in the orifice chamber wherein the first section is defined downstream of the exit of the inlet pipe up to a location of the first orifice plate (for e.g., the orifice plate 16), and the second section is defined downstream of the first section, i.e., from the location of the first orifice plate up to the location of the outlet pipe, within the orifice chamber. The first region may have a flow length X required to develop a fully developed uniform flow inside the orifice chamber before making contact with the orifice plates during the downward flow of the flue gas. According to an aspect of the present invention, an assembly of the orifice chamber is provided that may reduce the flow length X required for achieving a fully developed uniform flow of the flue gas within the first section. Thus, at least one or two additional auxiliary orifice plates may be provided within the first section that may assist in achieving further gradual pressure drop across the orifice plates for the flue gas flowing in the orifice chamber. Thus, the requirement for an additional orifice chamber may be eliminated. Also, the assembly of the orifice chamber thus provided in the present invention achieves uniform flow of the flue gas within the initial region, i.e., the first section, before coming in contact with the additional one or two auxiliary office plates, therefore the chances of wear on the additional auxiliary plate are minimal.

The assembly of the orifice chamber as provided in the present invention comprises of a flow developer means and at least one auxiliary orifice plate within the first section of the orifice chamber. In one embodiment, at least two auxiliary orifice plates may be positioned within the first section. In accordance with an embodiment of the present invention, the at least one auxiliary orifice plate located within the first section is situated at a length approximately between 0.3 times to 0.4 times the maximum flow length of the first section, i.e. the flow length X as described above for the first section. Thus, even before coming in contact with the first orifice plate amongst the plurality of orifice plates, which may be positioned at a location approximately about the flow length X of the first section, the at least one auxiliary orifice plate situated prior to the first orifice plate is able to achieve some amount of pressure drop from the flue gas.

In accordance with an embodiment of the present invention, the fully developed uniform flow may be achieved at a reduced flow length X corresponding to the first section by employing a flow developer means having a construction in accordance with one the embodiments described in the foregoing description.

Figure 2:
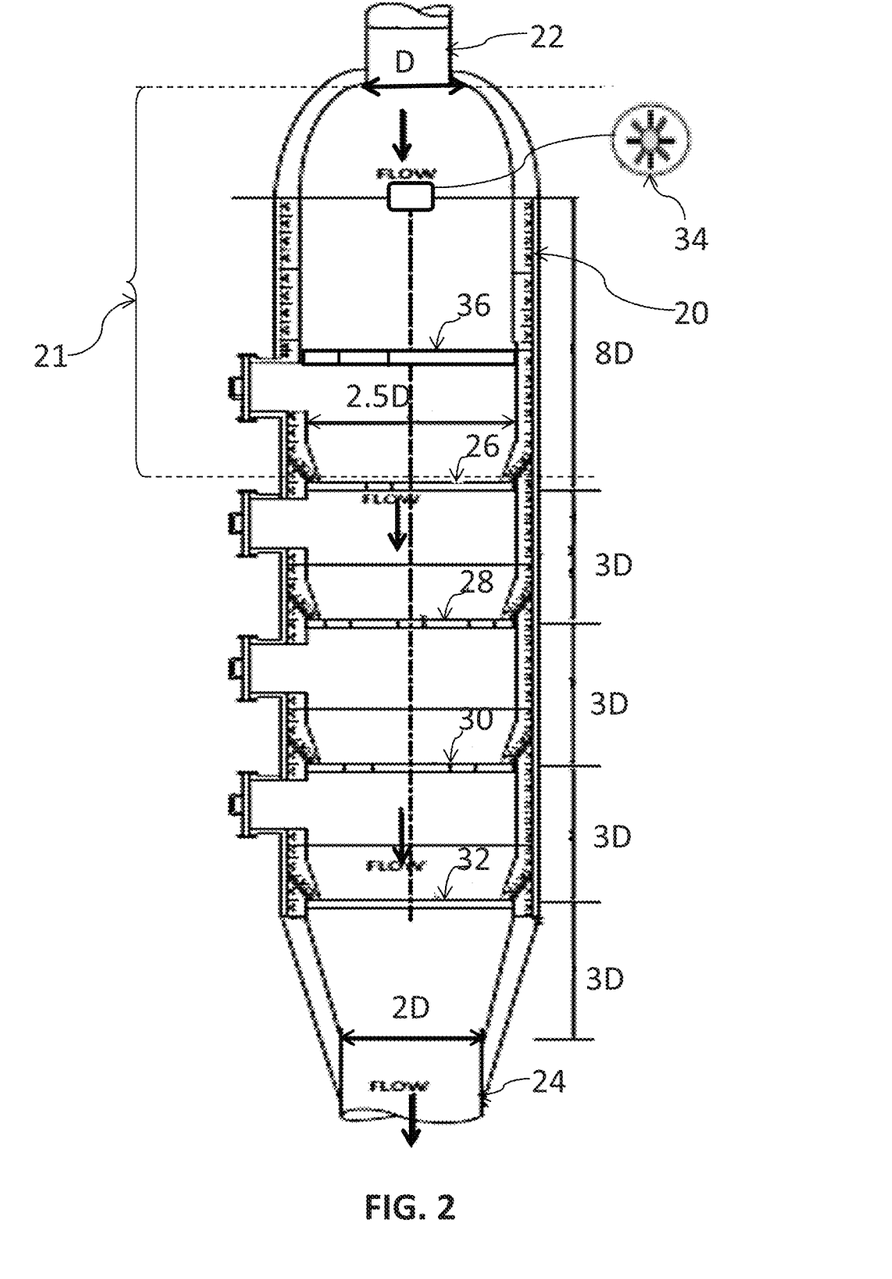
FIG. 2 illustrates an apparatus for reducing the pressure of flue gas including a flow developer means having a construction, in accordance with an embodiment of the present invention.

FIG. 2 illustrates an apparatus for reducing the pressure of a flue gas generated during a combustion process in a regenerator of the FCC unit (not shown), in accordance with the various embodiments of the present invention as described above. The apparatus as illustrated in FIG. 2 includes an orifice chamber 20 including an inlet pipe 22 having a diameter D, an outlet pipe 24 having a diameter approximately twice the diameter of the inlet pipe 22, i.e., 2D and wherein the cross-section of the orifice chamber 22 may have a diameter approximately 2.5 times the diameter of the inlet pipe 22, i.e., 2.5D. The flow region as described above is defined downstream of the exit of the inlet pipe 22 up to the outlet pipe 24 where the flow region comprises of a first section 21 having a flow length X as described above and a s second section (not marked) defined downstream of the first section 21. The first section includes a flow developer means 34, in accordance with one embodiment of the present invention and the at least one auxiliary orifice plate 36, as described above. The second section comprises of the plurality of orifice plates (26, 28, 30 and 32) spaced apart across the length of the section within the orifice chamber. As illustrated, each of the orifice plate (26, 28, 30 and 32) is spaced equally apart across the length of the second section defined within the orifice chamber 20, i.e., by a length three times the diameter of the inlet pipe 22, i.e., 3D.

Accordingly, an approximate length of the orifice chamber 20 may about 20 times the diameter of the inlet pipe 22, i.e., 20D. The flow developer means illustrated in FIG. 2 is in accordance with one of the embodiments of the present invention which can achieve a fully developed flow within a region above the location of the auxiliary orifice plate 36 within the orifice chamber 20. The flow developer means 34 embodied and illustrated in FIG. 2 includes a plurality of circumferentially oriented vanes directed radially outwards towards walls of the orifice chamber 20. One of the ends of each of the plurality of vanes may be attached to the base of the flow developer and the other end of the each of the vane may be directed towards the walls of the orifice chamber 20. Such flow developer 34 place at the proximity of the inlet pipe 22 quickly develops uniform flow within a short distance of the flow length X defined in the first section by diverting some amount of the flue gas towards the walls of the orifice chamber and thus achieves uniformity of flow of the flue gas across the cross-section of the orifice chamber 20. In accordance with an embodiment of the present invention, the flow developer means 34 is positioned along a vertical axis of symmetry of the orifice chamber. Further, the flow developer means 34 is offset vertically from the exit of the inlet pipe 22.

Figure 3:
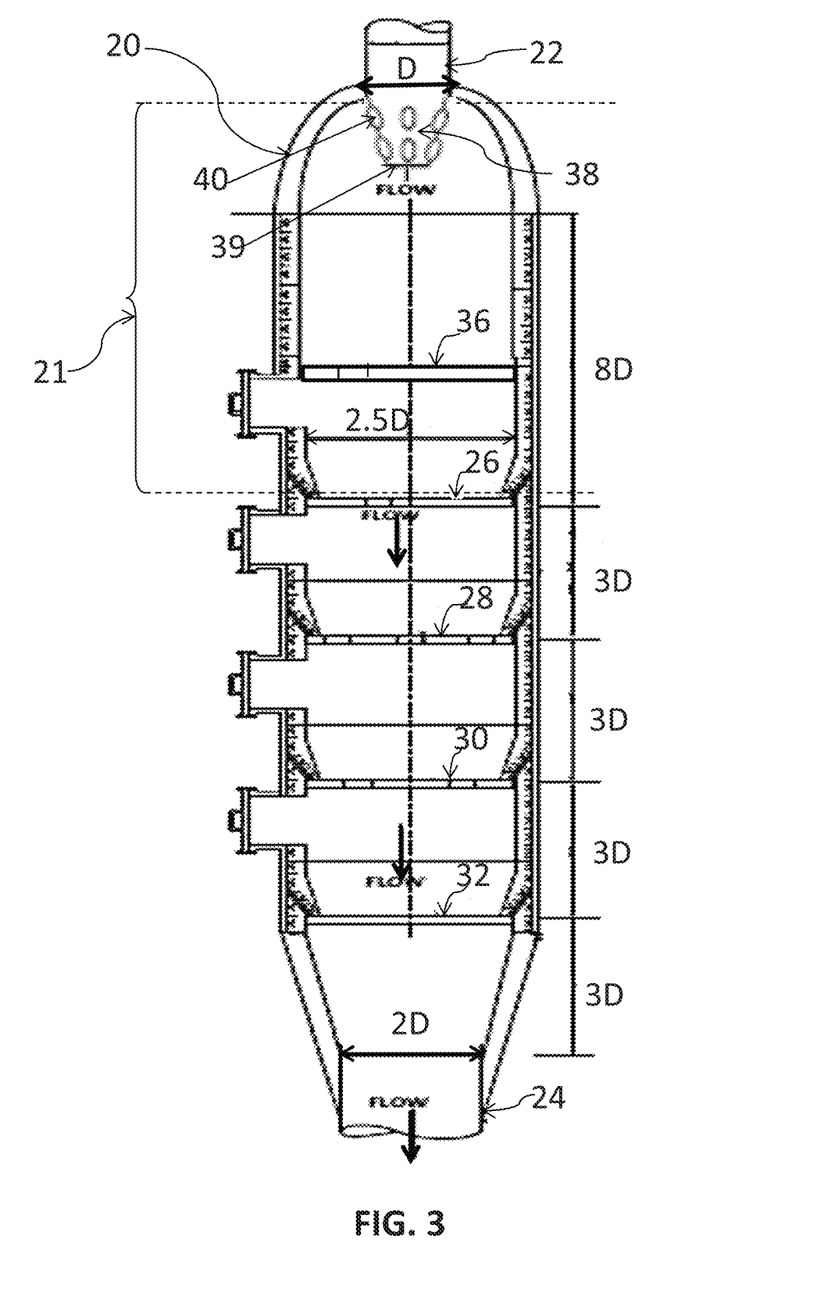
FIG. 3 illustrates an apparatus for reducing the pressure of flue gas including a flow developer means having a construction, in accordance with another embodiment of the present invention.

FIG. 3 illustrates the apparatus for reducing pressure of a flue gas in accordance with the various embodiments of the present invention as described above with reference to FIG. 2, where the flow developer means illustrated in FIG. 3 is in accordance with another embodiment of the present invention which can achieve a fully developed flow within a region above the location of the auxiliary orifice plate 36 within the orifice chamber 20. The flow developer means 34 embodied and illustrated in FIG. 3 includes a constricted section 38 downstream of the exit of the inlet pipe 22, wherein the constricted section 38 is tapered longitudinally and having a closed distal end 39. In one embodiment, the constricted section may be tapered longitudinally at an angle between 30 degrees to 60 degrees along an axial direction. The constricted section 38 defines a plurality of exits 40 on a tapered surface of the constricted section 38. The flue gas flowing downstream of the exit of the inlet pipe 22 enters the constricted section 38 and thereafter is directed radially through the plurality of exits 40 towards the walls of the orifice chamber 20 for uniformly distributing the flue gas across the cross-section of the orifice chamber 20. Thus, a fully developed flow is quickly achieved within a short distance of the flow length (X) defined in the first section.

In one embodiment, the plurality of exits 40 may include nozzles longitudinally placed along the tapered surface of the constricted section 38. The nozzles may be uniformly and radially distributed on the tapered surface of the constricted section 40. Further, the nozzles may have one open end facing the walls of the orifice chamber 20 for dispersing the flue gas radially towards the walls of the orifice chamber 20.

Figure 4:
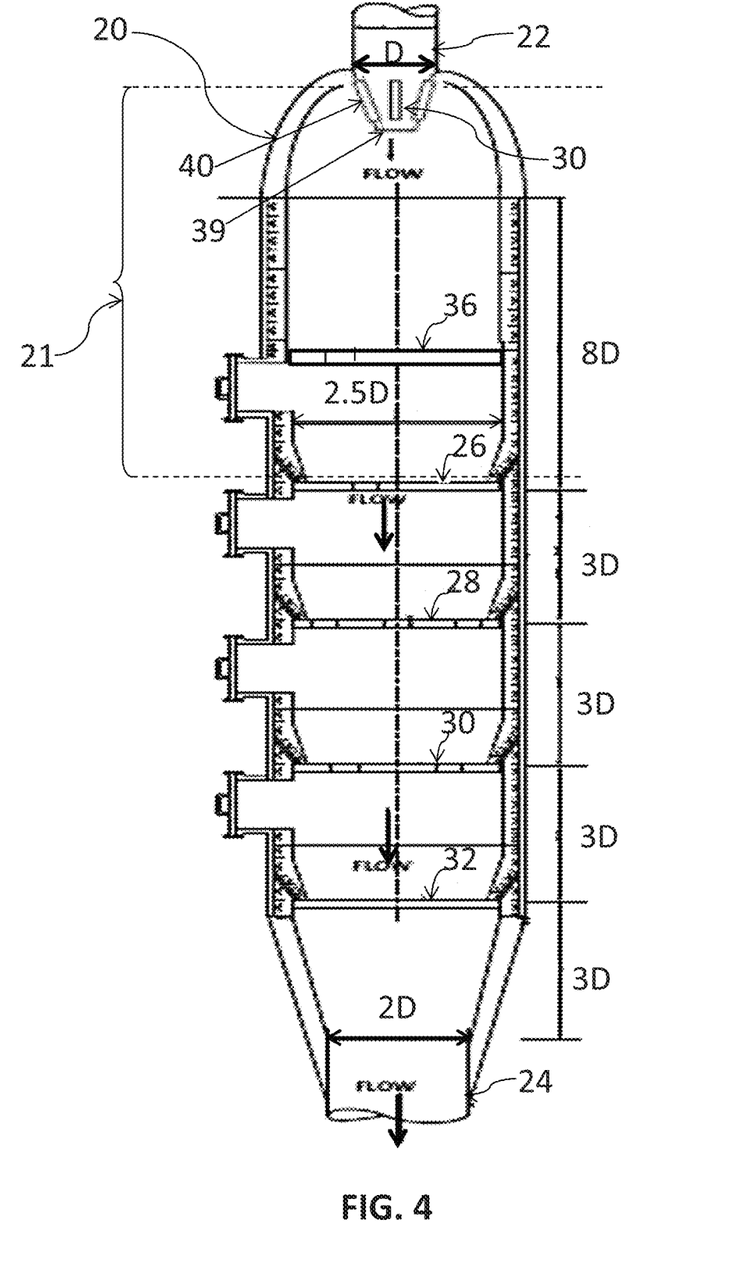
FIG. 4 illustrates an apparatus for reducing the pressure of flue gas including a flow developer means having a construction, in accordance with yet another embodiment of the present invention.
Figure 5A:
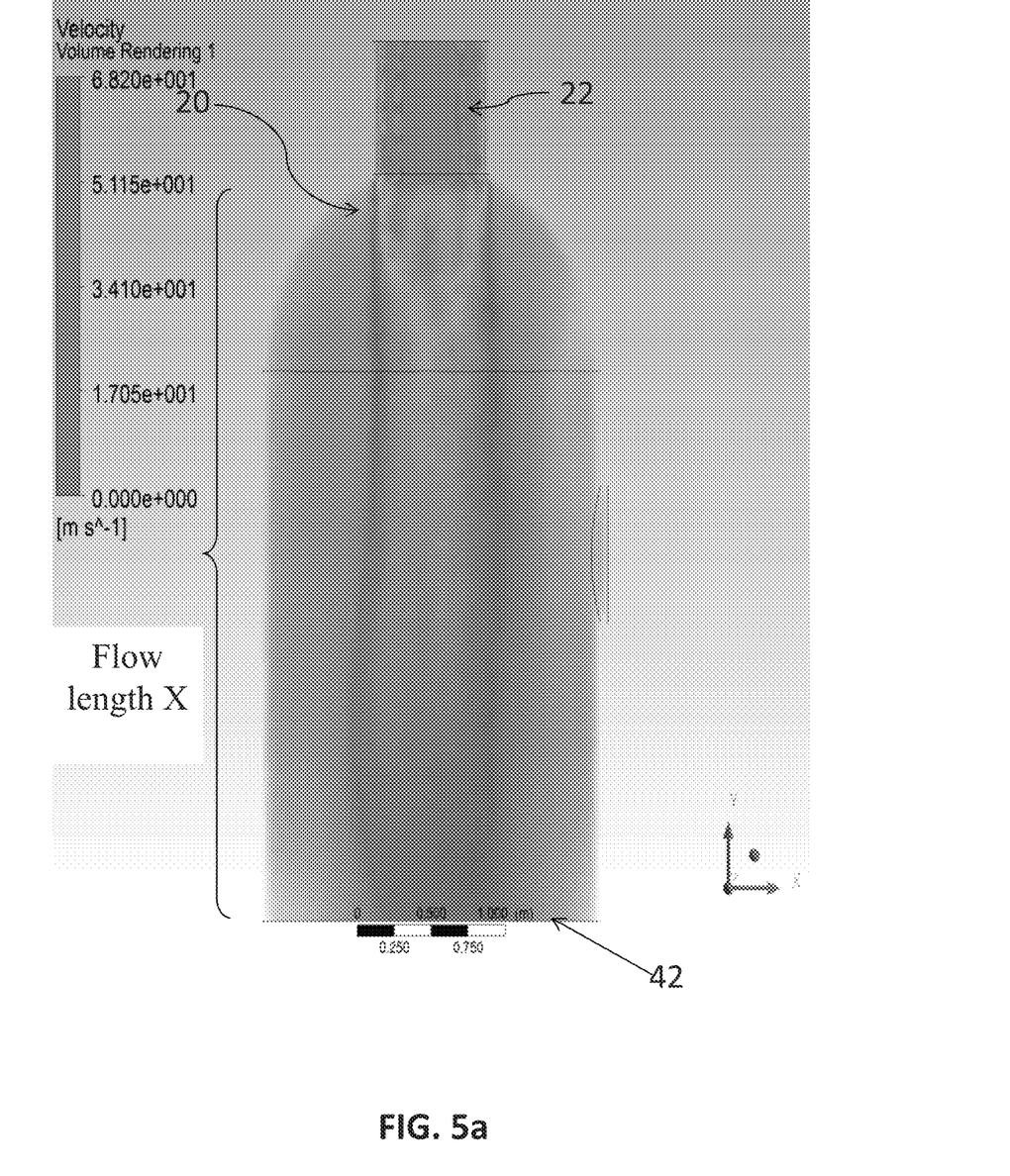
FIGS. 5a-5d illustrates an experiment for velocity distribution achieved in an orifice chamber of an apparatus for reducing the pressure of flue gas, without and with a flow developer means in accordance with one of the embodiments of the present invention.
Figure 5B:
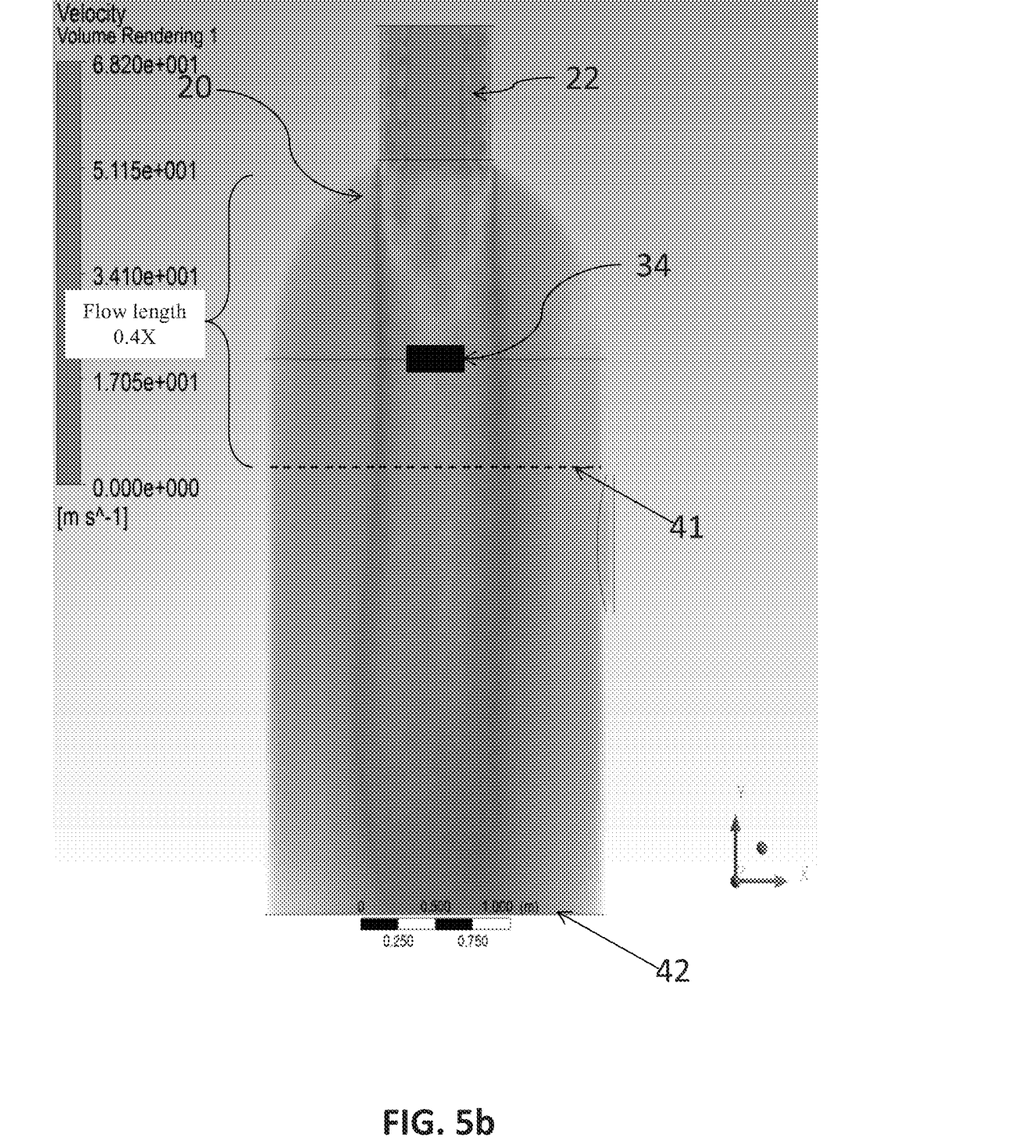
Figure 5C:
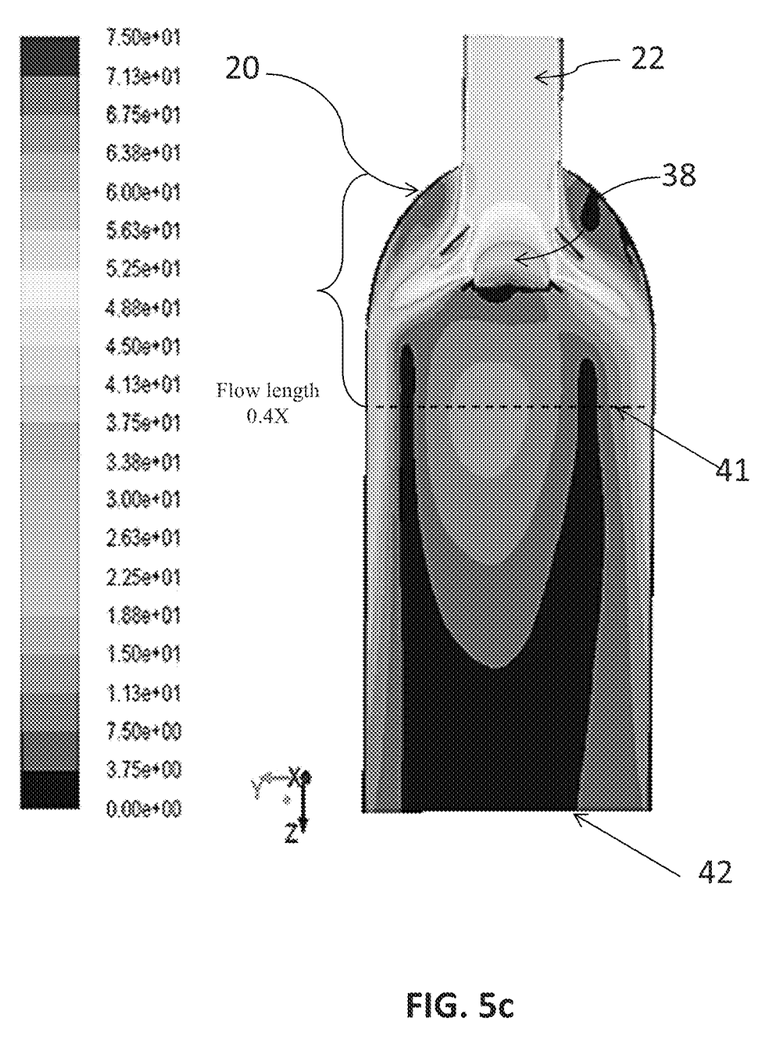
Figure 5D:
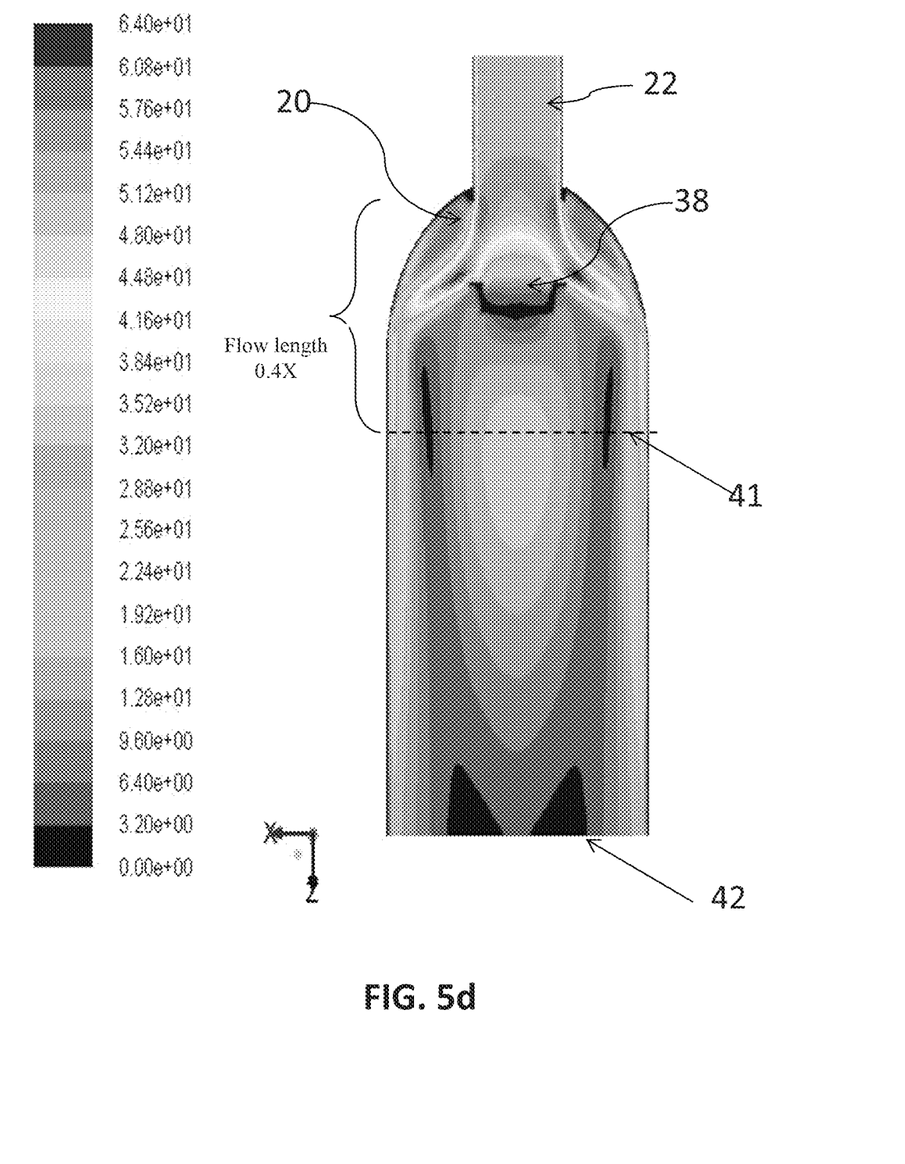

In one embodiment, the plurality of exits 40 may include slits longitudinally cut along the tapered surface of the constricted section 38, as illustrated in FIG. 4. The slits as cut may be radially distributed on the tapered section of the constricted section 40 for distributing the flue gas uniformly within the orifice chamber 20 by radially dispersing the flue gas towards the walls of the orifice chamber 20.

The flow developer means (34, 38) as provided and embodied in the present invention achieves a fully developed flow of flue gas in short distance within the first section of the orifice chamber, which is at a reduced length of the flow length (X) of the first section. Accordingly, additional auxiliary orifice plates (36) can be accommodated in the orifice chamber 20 to achieve higher pressure drop during revamp applications. Further, the flow developer means in effect provides a cushion in the space within the first section 21 as required for installing the additional auxiliary office plate (36) to achieve more pressure drop.

By way of an example, FIG. 5 represents pictorial representations of a fully developed flow region in the orifice chamber 20 without and with the flow developer means as described in the present invention. The pictorial representations are only for illustrative purposes and should not be construed as limiting to the present invention. The pictorial representations for these examples provided have been generated using Computational Fluid Dynamics (CFD) software. FIG. 5(a) represents velocity distribution in the orifice chamber 20 corresponding to the downward flow of the flue gas inside the orifice chamber 20 without the flow developer means. As such the fully developed flow region of the flue gas may be achieved at the flow length X of the first section 21 (see FIG. 2) or in the section 11 as described above with respect to FIG. 1 (prior art). The location of the first orifice plate positioned in the orifice chamber is shown at 42 located at a necessary distance between the inlet pipe 22 and the first orifice plate (not shown), for achieving uniform flow expansion. As shown in above FIGS. 2 to 4, the first orifice plate is typically placed at 8 to 10 times the diameter (D) of the inlet pipe 22. FIG. 5(b) represents velocity distribution in the orifice chamber 20 corresponding to the downward flow of the flue gas inside the orifice chamber 20 with the flow developer means 34. Due to the uniform flow distribution achieved by the flow developer means 34, a fully developed flow region for the downward flow of the flue gas is formed at a distance 0.4X. As such, an auxiliary orifice plate can be positioned at a location shown at 41 inside the first section 21 of the orifice chamber 20. FIG. 5(c) represents velocity distribution in the orifice chamber 20 corresponding to the downward flow of the flue gas inside the orifice chamber 20 with the flow developer means 38 including a plurality of nozzles. FIG. 5(d) represents velocity distribution in the orifice chamber 20 corresponding to the downward flow of the flue gas inside the orifice chamber 20 with the flow developer means 38 including a plurality of slits.

In accordance with the above-described embodiments, a method of reducing the pressure of a flue gas using the apparatus as disclosed above is provided in the present invention. During operation, the inlet pipe 22 which may be connected to a flow valve may receive the pressure controlled flue gas generated during revamp applications and may introduce the flue gas through the flow developer means (34, 38) into the orifice chamber 20. The flue gas undergoes a progressive small reduction in pressure between the successive orifice plates including the auxiliary orifice plate 36 of the first section 21 and the plurality of orifice plates of the second section and is finally dispersed as a pressure reduced flue gas through the outlet pipe 24.

While specific language has been used to describe the disclosure, any limitations arising on account of the same are not intended. As would be apparent to a person in the art, various working modifications may be made to the method in order to implement the inventive concept as taught herein. The scope of the embodiments is by no means limited by these specific examples. The scope of the embodiments is at least as broad as given by the following claims.

The invention claimed is:

1. An apparatus for reducing pressure of flue gas, comprising:
an orifice chamber having:
an inlet pipe for receiving the flue gas;
a flow region defined downstream of an exit of the inlet pipe and having at least a first section and a second section, the first section defined downstream of the inlet pipe and the second section defined downstream of the first section; and
an outlet pipe to disperse a pressure reduced flue gas wherein the first section having a constricted section downstream of the exit of the inlet pipe to flow the flue gas in the orifice chamber and at least one auxiliary orifice plate, wherein the second section having a plurality of orifice plates spaced apart along a flow length of the second section, and wherein a distance of the at least one auxiliary orifice plate from the exit of the inlet pipe is in a range of 0.3 times a maximum flow length of the first section and 0.4 times the maximum flow length of the first section, the maximum flow length of the first section defined between the exit of the inlet pipe and location of a first orifice plate amongst the plurality of orifice plates of the second section.

2. The apparatus as claimed in claim 1, wherein the constricted section includes a plurality of circumferentially oriented vanes directed radially outwards towards walls of the orifice chamber.

3. The apparatus as claimed in claim 2, wherein the constricted section is positioned along a vertical axis of symmetry of the orifice chamber.

4. The apparatus as claimed in claim 1, wherein the constricted section is offset vertically from the exit of the inlet pipe.

5. The apparatus as claimed in claim 1, wherein the constricted section is tapered longitudinally and having a closed distal end, the constricted section defining a plurality of exits on a tapered surface of the constricted section.

6. The apparatus as claimed in claim 5, wherein the plurality of exits includes nozzles longitudinally placed along the tapered surface of the constricted section.

7. The apparatus as claimed in claim 5, wherein the plurality of exits includes slits longitudinally cut along the tapered surface of the constricted section.

8. The apparatus as claimed in claim 5, wherein the constricted section is tapered longitudinally at an angle between 30 degrees to 60 degrees along an axial direction.

9. The apparatus as claimed in claim 1 is a part of a fluid catalytic cracking (FCC) unit wherein the flue gas is generated during a combustion process in the FCC unit.

10. A method for reducing pressure of a flue gas, said method comprising:
providing an apparatus comprising:
an orifice chamber having:
an inlet pipe for receiving the flue gas;
a flow region defined downstream of an exit of the inlet pipe and having at least a first section and a second section, the first section defined downstream of the inlet pipe and the second section defined downstream of the first section; and
an outlet pipe to disperse a pressure reduced flue gas, wherein the first section having a constricted section downstream of the exit of the inlet pipe to flow the flue gas in the orifice chamber and at least one auxiliary orifice plate wherein the second section having a plurality of orifice plates spaced apart along a flow length of the second section, and wherein a distance of the at least one auxiliary orifice plate from the exit of the inlet pipe is in a range of 0.3 times a maximum flow length of the first section and 0.4 times the maximum flow length of the first section, the maximum flow length of the first section defined between the exit of the inlet pipe and location of a first orifice plate amongst the plurality of orifice plates of the second section,
the method further comprising:
introducing the flue gas into the inlet pipe of the orifice chamber;
achieving progressive reduction of pressure of the flue gas between successive orifice plates including the at least one auxiliary orifice plate of the first section and the plurality of orifice plates of the second section; and
dispersing the pressure reduced flue gas through the outlet pipe.

* * * * *